Patented Apr. 4, 1939

2,153,406

UNITED STATES PATENT OFFICE 2,153,406

PROCESS FOR THE PREPARATION OF METHACRYLIC ACID

Walter Bauer, Darmstadt, Germany, assignor to Röhm & Haas Company, Philadelphia, Pa.

No Drawing. Application June 30, 1936, Serial No. 88,089. In Germany July 2, 1935

4 Claims. (Cl. 260—539)

This invention relates to a process for the oxidation of methacrolein (α-methyl acrolein) to form methacrylic acid and particularly to the use of certain catalysts suitable for increasing the rate of the oxidation.

Methacrylic acid has been made in the past by several methods one of which is to treat acetone with hydrocyanic acid to produce acetone cyanohydrin and then to hydrolyze and dehydrate this product to form the acid. It has also been made by splitting hydrogen chloride out of β-chlorisobutyric acid.

It has now been found that methacrolein, obtainable by dehydrogenation or oxidation of β-methyl allyl alcohol, can be oxidized to methacrylic acid by means of gaseous oxygen or a gas containing oxygen and that this process may be accelerated by the addition of soluble salts of certain metals, such as copper, nickel, cobalt and manganese, to the reaction mixture. It is known that compounds like methacrolein and methacrylic acid polymerize readily and that oxygen will accelerate this polymerization. In order to obtain satisfactory yields of the methacrylic acid it is necessary to minimize the tendency to polymerize and it has been found that certain polymerization retarders may be added to the reaction mixture so that, during the oxidation, practically no polymerization takes place. Furthermore, the reaction may be carried out in the presence of organic solvents in order to facilitate the control of the oxidation. Water, however, should not be present as it has a detrimental effect on the reaction.

The present process is carried out in general by dissolving the methacrolein in an inert liquid, adding thereto a suitable catalyst or polymerization retarder or both and passing oxygen, air or other oxygen-containing gas into the solution at any desired pressures from below to above atmospheric. It is preferable, however, to use superatmospheric pressure which may be as high as twenty atmospheres or more.

Suitable solvents for this process must not be affected by the oxygen nor by the catalysts used. Such solvents are principally the low boiling hydrocarbons of the aliphatic and aromatic series, and their chlorinated derivatives as, for example, benzene, gasoline, carbon tetrachloride, trichloroethylene, ethylene dichloride, etc.

The catalysts best suited for the purpose are salts of copper, nickel, cobalt and manganese and preferably salts of organic acids such as oleic, stearic, etc. The acrylates and methacrylates of these metals are particularly suitable.

The process is best carried out at temperatures between 20° and 60° C. although lower or higher temperatures may be employed if desired. The relative amounts of methacrolein and solvent may vary over a wide range. It is possible to use as much as 80% of methacrolein in the mixture but for commercial production it is preferable to keep the concentration below about 50% and concentrations of 10 to 25% have been found to give very satisfactory results, particularly in large scale operations.

In all cases water should be excluded from the reaction mixture as far as possible. Thus, anhydrous solvents should be chosen and preferably those which can dissolve or absorb only very small amounts of water. It is permissible to have organic hydroxy compounds present although their amount should be small as otherwise they have an unfavorable effect on the oxidation process. Small amounts of the organic hydroxy compound may exert a favorable influence on the reaction by retarding the polymerization of the methacrolein and methacrylic acid. Amounts of alcohols ranging from 5 to 20% may be used without any detrimental effect. Other polymerization retarders such as sulfur and copper may be used during the oxidation process but organic retarders such as phenol, hydroquinone, etc., are best used after oxidation is completed in order to prevent polymerization of the methacrylic acid. When alcohols are present, it is possible to esterify the acid formed in the same reaction mixture.

The oxidation may also be made more effective by insuring an intimate contact between the gas and the liquid by agitation, spraying or by flowing the liquid over large surfaces so as to expose as much as possible of the liquid to the action of the oxygen.

The process may be carried out continuously or in separate batches. In both cases it is advantageous to have the solution of methacrolein in the continuous phase and to bring it into contact with the air in finely dispersed form.

The following examples will illustrate the invention which, however, is not limited to the exact time, temperature, concentration, catalyst, retarder, etc., shown as the invention may be otherwise practiced within the scope of the appended claims.

*Example 1*

A mixture of 1 kg. of methacrolein (B. P. 68° C.) and 1 kg. of benzol, to which has been added about 0.5% of pulverized sulfur and about 1% of copper acrylate, is charged into a reaction tower. Air is admitted at the bottom of the tower through a nozzle at the rate of about 1.5 liters per minute. The reaction mixture is preferably kept in constant circulation during the entire time. The air which passes through the solution is led into a reflux condenser in which any entrained vapors of methacrolein are condensed and returned to the reaction mixture. At the end of 12 hours about 80% of the methacrolein is converted to methacrylic acid which may be separated by fractional distillation. In order to prevent the polymerization of the methacrylic acid during the fractionation about 2% of hydroquinone is added.

Example 2

A 40% solution of methacrolein in benzol is heated to 50° C. and treated with oxygen at a pressure of 20 atmospheres for 10 hours. The solution is agitated during the entire operation. In this time 70 to 80% of the methacrolein is oxidized to methacrylic acid. About 2% of tannin is added to the solution and the methacrylic acid removed by fractional distillation under reduced pressure.

Example 3

80 parts of a 50% solution of methacrolein in benzol, containing 2 parts of mostly undissolved copper acrylate, is heated for 25 hours at 50° C. under an oxygen pressure of 2 atmospheres. 90 to 95% of the methacrolein is converted to methacrylic acid.

Example 4

A mixture of 10 parts of methacrolein, 90 parts of toluol and 0.1 part of nickel acrylate are treated at 50° C. with oxygen at a pressure of 2 atmospheres. Methacrylic acid is formed but at a somewhat slower rate than when benzol is used as the solvent.

Example 5

A mixture of 20 parts of methacrolein and 20 parts of methylene chloride containing 0.5 part of copper acrylate and 5 parts of copper shavings is treated at 50° C. with oxygen under a pressure of about 2 atmospheres. At the end of 25 hours about 90% of the methacrolein is converted to methacrylic acid.

Example 6

A mixture of 20 parts of methacrolein and 80 parts of methylene chloride to which has been added 0.5 part of copper acrylate and 2 parts of copper shavings is treated at 40° to 50° C. with oxygen at a pressure of 5 atmospheres. At the end of 25 hours 85 to 95% of the methacrolein has been converted to methacrylic acid.

In place of the methylene chloride shown in the foregoing examples other chlorinated hydrocarbons may be used, for example, carbon tetrachloride, acetylene tetrachloride, etc.

In place of the nickel and copper acrylates shown in the foregoing examples cobalt or manganese acrylate or the methacrylate of copper, nickel, cobalt and manganese may be used with equally good results. These catalysts are in general nearly insoluble or soluble only with difficulty in the reaction mixture.

The methacrylic acid thus produced may be converted into its esters in any desired manner. It is advantageous to use a polymerization retarder, such as a phenol, an aromatic amine, sulfur or copper, during the esterification. Salts of the acid may also be prepared and the ammonium salt can be converted to the amide by heating.

I claim:

1. The process of oxidizing methacrolein to methacrylic acid which comprises treating the methacrolein in an inert anhydrous solvent with gaseous oxygen in the presence of an oxidation catalyst which is an organic salt of a metal of the group consisting of copper, nickel, cobalt and manganese.

2. The process of oxidizing methacrolein to methacrylic acid which comprises treating the methacrolein in an inert anhydrous solvent with gaseous oxygen in the presence of copper acrylate.

3. The process of oxidizing methacrolein to methacrylic acid which comprises treating the methacrolein in an inert anhydrous solvent with gaseous oxygen at temperatures of from about 20° C. to about 60° C. and oxygen pressures up to about 20 atmospheres in the presence of an oxidation catalyst which is an organic salt of a metal of the group consisting of copper, nickel, cobalt and manganese.

4. The process of oxidizing methacrolein to methacrylic acid which comprises treating the methacrolein dissolved in benzol with gaseous oxygen in the presence of copper acrylate at temperatures of from about 20° C. to about 60° C. and oxygen pressures up to about 20 atmospheres.

WALTER BAUER.